(12) United States Patent
Hou

(10) Patent No.: US 9,452,558 B2
(45) Date of Patent: Sep. 27, 2016

(54) MOLD APPARATUS AND MANUFACTURING METHOD THEREOF

(71) Applicant: GeniuS Electronic Optical Co., Ltd., Taichung (TW)

(72) Inventor: Hsien-Chang Hou, Taichung (TW)

(73) Assignee: GENIUS ELECTRONICS OPTICAL CO., LTD. (TW)

( * ) Notice: Subject to any disclaimer, the term of this patent is extended or adjusted under 35 U.S.C. 154(b) by 0 days.

(21) Appl. No.: 14/657,933

(22) Filed: Mar. 13, 2015

(65) Prior Publication Data
US 2015/0258722 A1    Sep. 17, 2015

(30) Foreign Application Priority Data
Mar. 13, 2014    (TW) .............................. 103109100 A

(51) Int. Cl.
*B29C 45/73*    (2006.01)
(52) U.S. Cl.
CPC ... *B29C 45/7312* (2013.01); *B29C 2945/7604* (2013.01); *B29C 2945/76267* (2013.01); *B29C 2945/76454* (2013.01); *B29C 2945/76531* (2013.01); *Y10T 29/49826* (2015.01)
(58) Field of Classification Search
CPC .............................. B29C 45/7306–2045/7325
USPC ................................................ 425/547, 552
See application file for complete search history.

(56) References Cited

U.S. PATENT DOCUMENTS

| 3,760,874 | A | * | 9/1973 | Boskovic | ................ | B29C 33/04 138/38 |
| 4,743,192 | A | * | 5/1988 | Higuchi | .............. | B29C 45/7312 249/102 |
| 5,383,140 | A | * | 1/1995 | Nanno | ................... | G06F 1/1616 200/43.01 |
| 5,783,233 | A | * | 7/1998 | Takahashi | ........... | B29C 45/7312 264/107 |
| 5,945,140 | A | * | 8/1999 | Lin | ..................... | B29C 45/7312 249/79 |
| 7,159,837 | B2 | * | 1/2007 | Richards | ............. | B29C 45/7312 249/205 |
| 2008/0003325 | A1 | * | 1/2008 | Seaver | .................... | B22C 9/065 425/552 |

FOREIGN PATENT DOCUMENTS

| DE | 3728325 | * | 3/1988 |
| JP | 56-126141 | * | 10/1981 |
| JP | 243009 | | 2/1990 |

OTHER PUBLICATIONS

Official Action from Japanese Patent Application No. 2015-048335 dated Feb. 2, 2016.

* cited by examiner

*Primary Examiner* — Jill Heitbrink
(74) *Attorney, Agent, or Firm* — Baker & McKenzie LLP

(57) ABSTRACT

Mold apparatuses may comprise a mold body, a thermostat target area and a channel unit. Said thermostat target area may be defined in said mold body. The channel unit may comprise a thermostat channel which may be formed in said mold body and may be connected with the outside to maintain the temperature of said thermostat target area through the thermostat medium flowing through it, and a heat conductive partition disposed in the thermostat channel. Said thermostat channel may comprise a first channel located on one side of said heat conductive partition; a second channel located on the other side of said heat conductive partition; a first port connected with said first channel and the outside; a second port connected with said second channel and the outside; and a connect channel away from the first port and the second port and connected with said first channel and said second channel.

7 Claims, 17 Drawing Sheets

MOLD APPARATUS AND MANUFACTURING METHOD THEREOF

INCORPORATION BY REFERENCE

This application claims priority from R.O.C. Patent Application No. 103109100 filed on Mar. 13, 2014, the contents of which are hereby incorporated by reference in their entirety for all purposes.

TECHNICAL FIELD

The present disclosure relates to a mold apparatus and a manufacturing method thereof, and particularly, relates to an injecting mold apparatus and a manufacturing method thereof.

BACKGROUND

Referring to FIG. 1 and FIG. 2, a mold apparatus 1 may comprise a mold body 11, a molding cavity 12, and two thermostat channels 13.

The molding cavity 12 may be located in the mold body 11, and may have a sprue 121 connecting with the outside.

The thermostat channels 13 may be separately formed in the mold body 11 and may be located at the outside of the molding cavity 12. Each thermostat channel 13 may have an input port 131 and an output port 132 which may be formed on the outside surface of the mold body 11. The input port 131 and the output port 132 may maintain the temperature of the molding cavity 12 via the thermostat medium.

However, the thermostat channel 13 may have a drawback. When the thermostat medium flows through the thermostat channels 13, the thermostat medium may gradually absorb or release the heat produced by injecting melted materials into the molding cavity 12 through the sprue 121 and transmitting to the mold body 11, and the temperature of the thermostat medium may gradually increase between the input port 131 and the output port 132, so the temperature of the mold body 11 may not be uniform.

If the temperature of the mold body 11 is not uniform, the region near the molding cavity 12 may solidified because of the temperature difference during the process of injecting the material into the molding cavity 12. As a result, the material may not flow through the cavity 12 smoothly and the quality of the molding product may not be as desirable.

SUMMARY

According to some embodiments, the present disclosure may provide for a mold apparatus.

The mode apparatus may comprise a mold body, a thermostat target area, and a channel unit.

The thermostat may be defined in the mold body.

The channel unit may include a thermostat channel formed in the mold body and connected with the outside to maintain the temperature of the thermostat area through the heat exchange medium flowing through it, and a heat conductive partition disposed in the thermostat channel. The thermostat channel comprises a first channel located on one side of the heat conductive partition, a second channel located on the other side of the heat conductive partition, a first port connected with the first channel and the outside, a second port connected with the second channel and the outside, and a connect channel away from the first port and the second port and connected with the first channel and the second channel.

The present invention has at least one capability described below: the temperature of the heat exchange medium flowing through the first channel and the second channel is uniform via the first channel, the second channel and the head conductive partition, wherein the first channel and the second channel are symmetrical, and the first channel is near the second channel.

Therefore, another object of the present invention is to provide a manufacturing method of the mold apparatus.

The manufacturing method of the mold apparatus comprises the steps of:

Providing a top clamping plate, wherein a first port is formed on the side of the top clamping plate and a first channel is disposed on the bottom of the top clamping plate, one end of the first channel is connected with the first port;

Providing a heat conductive partition and a sealing ring surrounding around the outside of the heat conductive partition, wherein the heat conductive partition is located at the bottom surface of the top clamping plate, the heat conductive partition has a connect channel located at the other end of the first channel and connected with the first channel;

Providing a cavity plate, wherein the cavity plate is disposed on the bottom surface of the top clamping plate, the cavity plate has a binding surface closed to the top clamping plate, a parting surface opposite to the top clamping plate, and a side surface connected between the binding surface and the parting surface, a second channel is disposed at the binding surface, the first channel and the second channel are symmetrical, and the second channel is sealed by the heat conductive partition, a groove is formed in the parting surface, a second port is formed on the side surface, the two ends of the second channel are connected with the second port and the connect channel connecting with the heat conductive partition, the assembly of the first channel, the first port, the second channel, the second port, and the connect channel forms a thermostat channel, and the assembly of the thermostat channel, the heat conductive partition, and the sealing ring forms a channel unit, the assembly of the top clamping plate and the cavity plate forms a first mold base;

Proving a first core and mounting the first core in the groove of the cavity plate, and the first core has a first molding surface;

Providing a second core, wherein the second core has a parting surfaces, and forming a groove on the parting surface;

Providing a second core, and mounting the second core in the groove of the second mold base, the second core has a second molding surface toward the first molding surface, when the parting surface of the first mold base abuts against the parting surface of the second mold base, the first molding surface, a cavity can be defined between the parting surface of the first mold base, the second molding surface, and the parting surface of the second mold base, and the thermostat channel is located at the outside of the groove of the cavity plate.

BRIEF DESCRIPTION OF THE DRAWINGS

Exemplary embodiments will be more readily understood from the following detailed description when read in conjunction with the appended drawing, in which.

DETAILED DESCRIPTION

Figure 1:
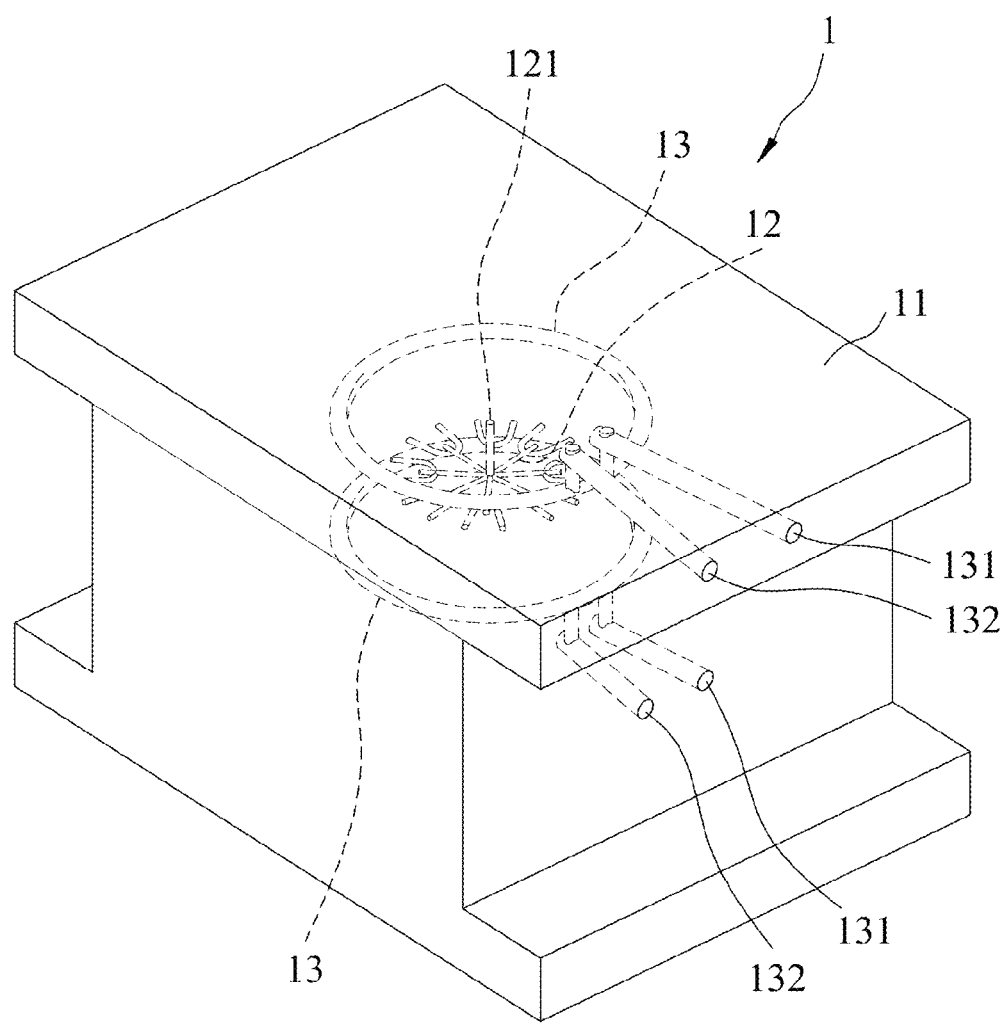
FIG. 1 is a perspective view of a mold apparatus according to a prior art.
Figure 2:
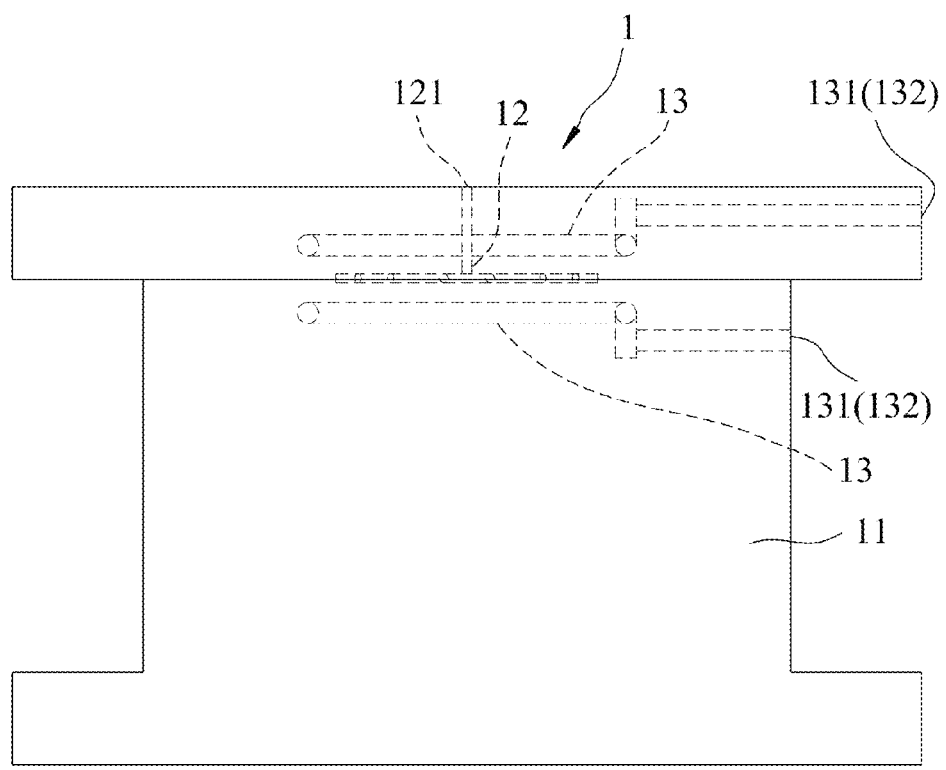
FIG. 2 is a side view of a mold apparatus according a prior art.
Figure 3:
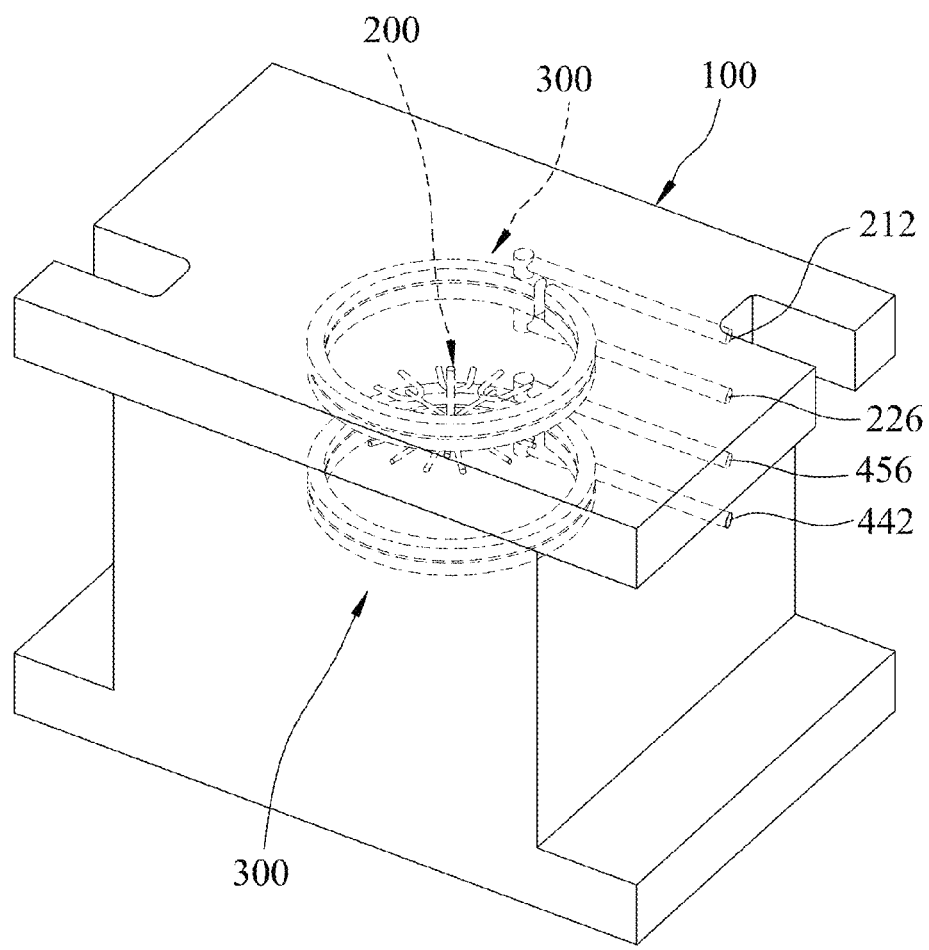
FIG. 3 is a perspective view of an embodiment of a mold apparatus according to the present invention.

Referring to FIG. 3, an embodiment of a mold apparatus of the present disclosure is presented. The mold apparatus may comprise a mold body 100, a thermostat target area 200 defined in the mold body 100, and two channel units 300 disposed in the mold body 100.

Figure 4:
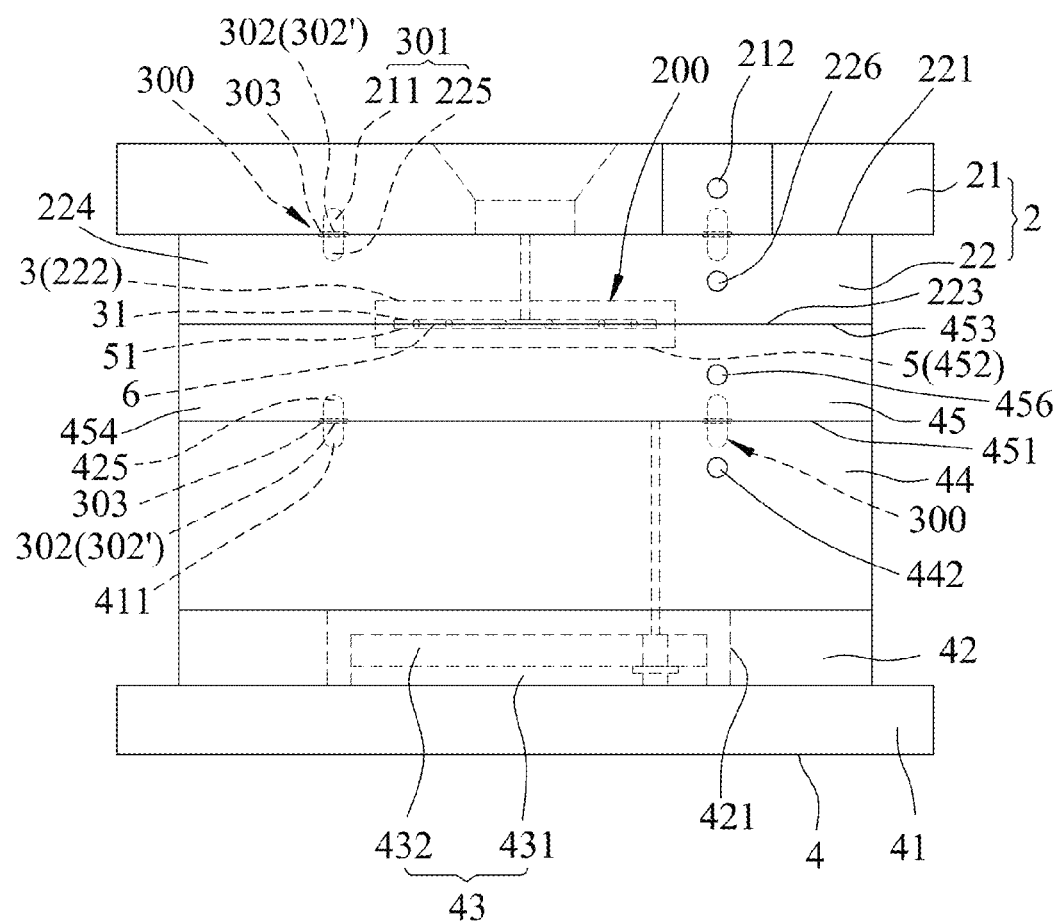
FIG. 4 is a side view of the mold apparatus in FIG. 3.
Figure 5:
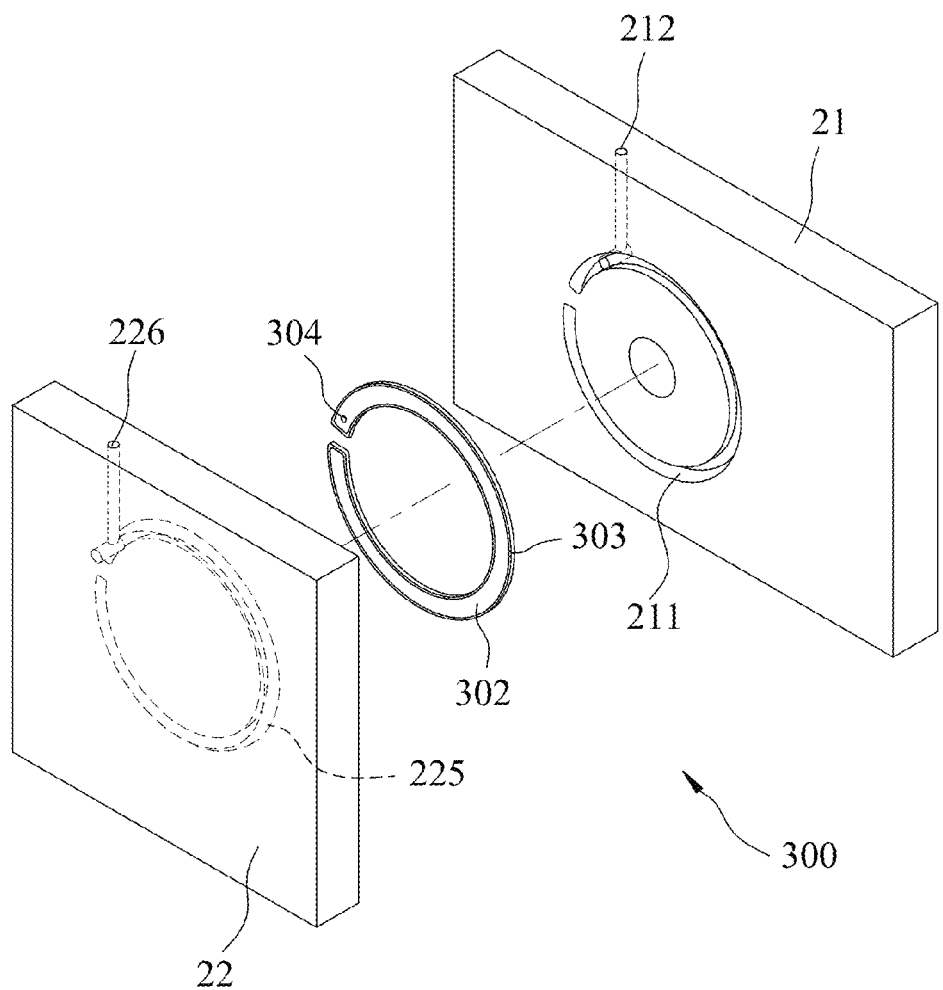
FIG. 5 is a perspective view of an embodiment of a channel unit according to the present invention.

Referring to FIG. 4 and FIG. 5, the mold body 100 may comprise a first mold base 2, a first core 3, a second mold base 4, and a second core 5.

The first mold base may include a top surface, a top clamping surface 21 connected with an injecting apparatus (not shown), a cavity plate 22 mounted on the bottom surface of the top clamping surface 21. The cavity plate 22 may have a binding surface 221 closed to the top clamping surface, a parting surface 223 which may be opposite to the top clamping surface and forms a groove 222, and a side surface 224 connected with the binding surface 221 and the parting surface 223.

The first core 3 may be disposed in the groove 222 of the cavity plate 22 and may have a first molding surface 31.

The second mold base may further comprise a bottom clamping plate 41, a spacer block 42 disposed on the top surface of the bottom clamping plate 41 and having a hole 421, an ejector plate unit 43 located in the hole 421 of the spacer block 42, a support plate 44 mounted on the top surface of the spacer block 42, and a core plate 45 mounted on the support plate 44. The ejector plate unit 43 may comprise a bottom ejector plate 431 and a top ejector plate 432 disposed on the top surface of the bottom ejector plate 431. The core plate 45 may include a binding surface 451 closed to the support plate 44, a parting surface 453 which may be opposite to the support plate 44 and may form a groove 452, and a side surface 454 connected with the binding surface 451 and the parting surface 453.

The second core 5 may be located in the groove 452 of the second mold base 4, and may have a second molding surface 51 faced to the first molding surface 31. When the parting surface 223 of the first mold base 2 abuts against the parting surface 453 of the second mold base 4, the first molding surface 31, the parting surface 223 of the first mold base 2, the second molding surface 51, and the parting surface 453 of the second mold base 4 may define a molding cavity 6. The molding cavity 6 may be connected with the injecting apparatus via a plurality of runners (not shown) formed in the top clamping plate 21 and the cavity plate 22.

In particular, the mold body 100 may be only one of familiar molds. In fact, any other mode with different shapes or sizes may be cooperated with the channel unit 300 to achieve the capability of the present disclosure. The structure of mold is not limited in the embodiments described in the present disclosure.

In some embodiments, the thermostat target region 200 may be defined by some parts of the mold body 100 which may delimit the molding cavity 6 and may be closed to the molding cavity 6. In other words, it may be desirable to maintain the temperature of the thermostat target region 200 so that the operating temperature of the molding cavity 6 may be kept at a constant value when operating the mold apparatus. Therefore, the range of the thermostat target region 200 may be in accordance with the requirement of a person having ordinary skill in the field of the present disclosure for operating temperature of mold apparatus. The range of the thermostat target region 200 for a mold apparatus with high precision and complexity may be different from the range of the thermostat target region 200 for a mold apparatus with low precision and complexity, and the range of the thermostat target region 200 may not be limited by the embodiments described in the present disclosure.

Figure 6:
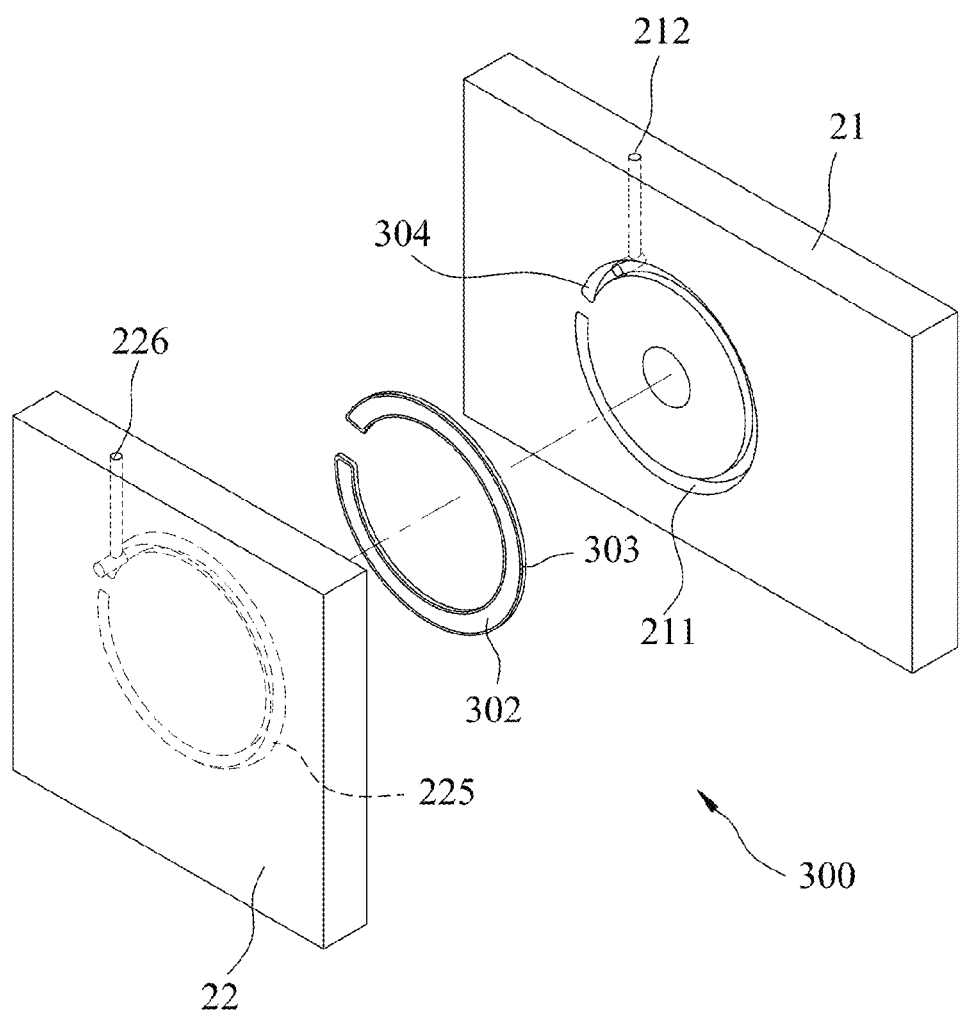
FIG. 6 is a second status of the channel unit in FIG. 5.

One channel unit 300 may be disposed between the top clamping plate 21 of the first mold base 2 and the cavity plate 22, and may include a thermostat channel 301, a heat conductive partition 302 mounted on the thermostat channel 301, and a sealing ring 303 surrounding around the heat conductive partition 302. The thermostat channel 301 may comprise a first channel 212 formed on the bottom surface of the top clamping plate 21, a second channel 225 formed on the binding surface of the cavity plate 22, a first port 212 formed on the top clamping plate 21 and connected with the first channel 211, a second port 226 formed on the side surface 224 of the cavity plate 22 and connected with the second channel 225, and a connect channel 304 formed on the heat conductive partition 302. The connect channel 304 may be opposite to the first port 212 and second port 226, and may be connected with the first channel 211 and the second channel 225. In some embodiments, the connect channel 304 may be a hole passing through the heat conductive partition 302. In some embodiments, the length of the heat conductive partition 302 may be shortened and the connect channel 304 may be delimited in accordance with the cooperation of the first channel 211 and second channel 225 (shown in FIG. 6).

Figure 7:
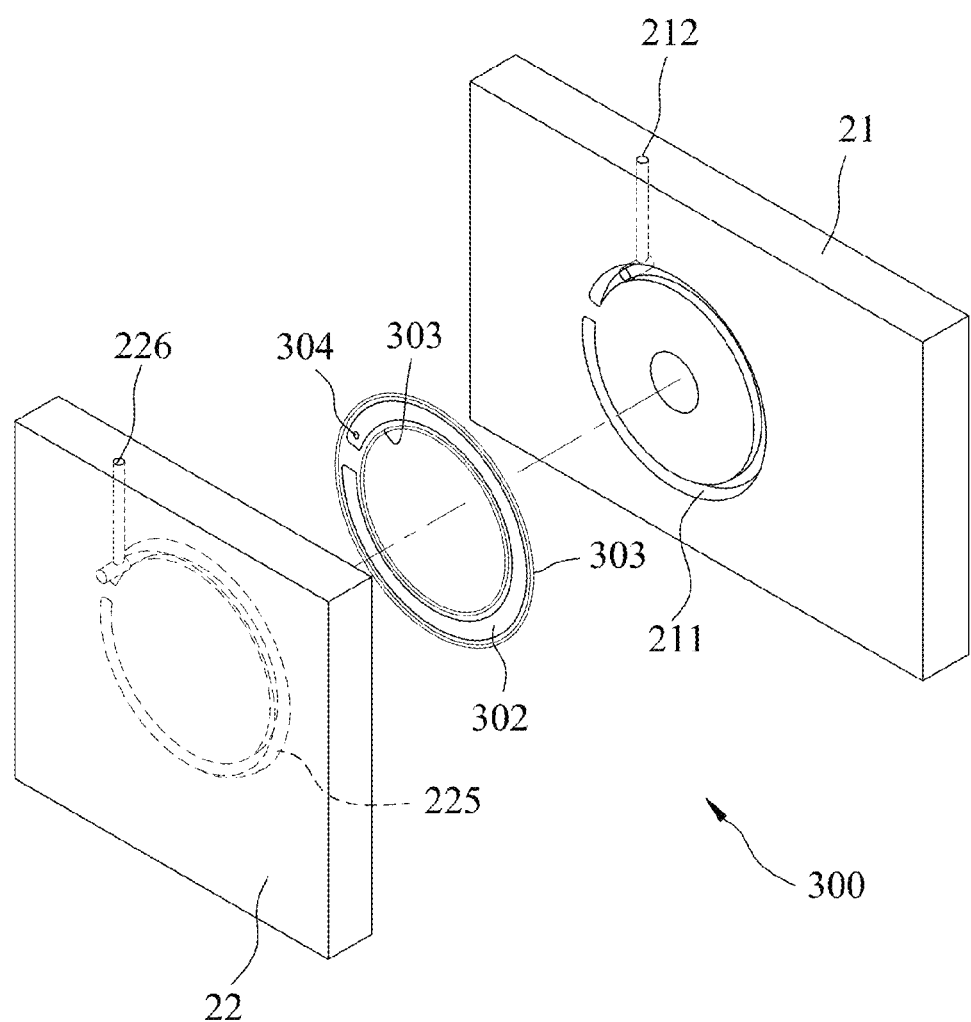
FIG. 7 is a third status of the channel unit in FIG. 5.

In some embodiments, the heat conductive partition 302 may be integral with the sealing ring 303 (shown in FIG. 5). Referring to FIG. 7, the heat conductive partition 302 may be assembled with two sealing rings 303 to promote the sealing capability. Because the sealing ring 303 may be used at high temperatures over a long period of time, the quality of the sealing ring 303 may decrease. According to embodiments of the present disclosure, a user or practitioner may only need to replace the sealing ring 303 and may not need to replace the heat conductive partition 302. As a result, operating costs may advantageously be reduced.

Another channel unit 300 may be mounted between the support plate 44 of the second mold base 4 and the core plate 45, and may comprise a thermostat channel 301, a heat conductive partition 302 mounted on the thermostat channel 301, and a sealing ring 303 surrounding around the heat conductive partition 302. The thermostat channel 301 may comprise a first channel 441 formed on the top surface of the support plate 44, a second channel 455 formed on the binding surface 451 of the core plate 45, a first port 442 formed on the support plate 44 and connected with the first channel 441, a second port 456 formed on the side surface 454 of the core plate 45 and connected with the second channel 455, and a connect channel 304 formed on the heat conductive partition 302. The connect channel 304 may be away from the first port 442 and the second port 456 and may be connected with the first channel 441 and the second channel 455. In some embodiments, the length of the heat conductive partition 302 may be shortened and the connect channel 304 may be delimited in accordance with the cooperation of the first channel 221 and the second channel 225.

Figure 8:
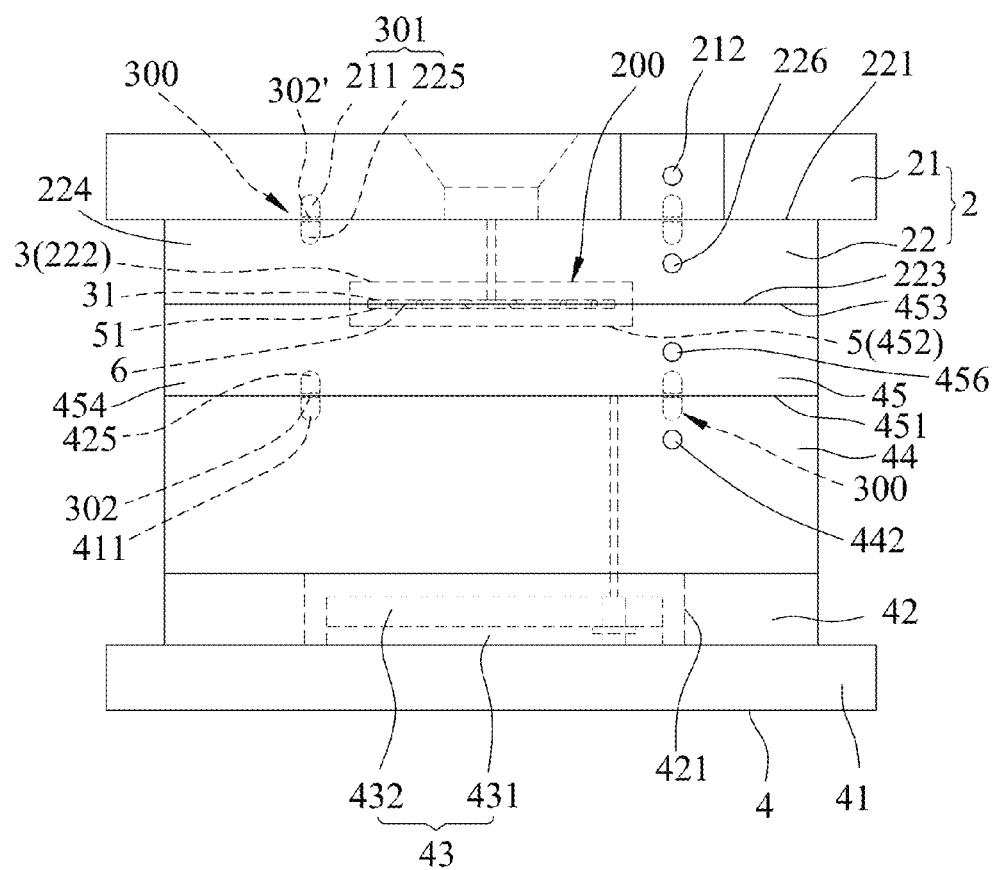
FIG. 8 is a side view of a second status of the mold apparatus in FIG. 3.

Referring to FIG. 8, the heat conductive partitions 302 of the channel units 300 may be integral with the first mold base 2 and the second mold base 4, and may respectively form heat conductive portions 302' of the first mold base 2 and the second mold base 4.

Figure 9:
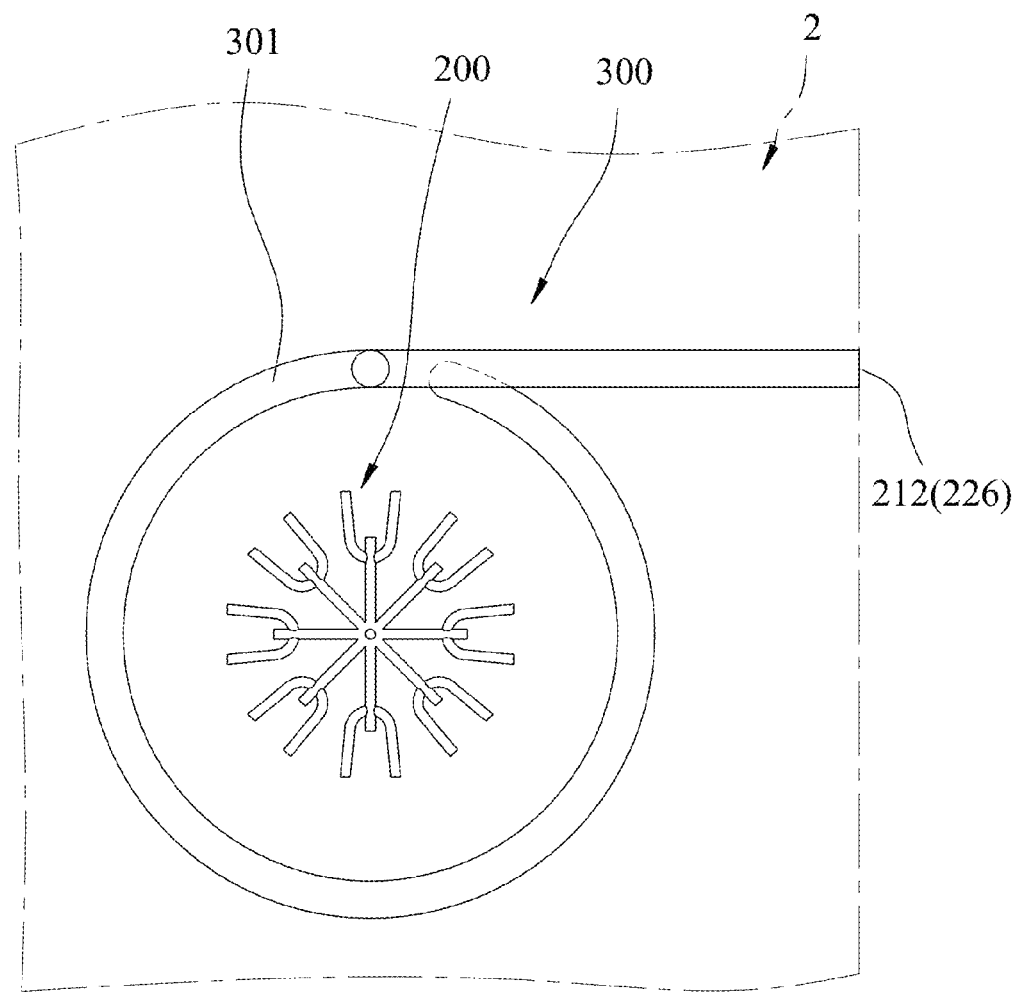
FIG. 9 is a schematic view of an embodiment of a thermostat channel of the channel unit forming a non-closed circular structure.

Referring to FIG. 3 and FIG. 9, each thermostat channel 301 may form a non-closed circular structure to surround the groove 222 (or 452). Therefore, each thermostat channel 301 may surround the thermostat target area 200.

The first port 212 of the first mold base 2 and the first port 442 of the second mold base 4 may be connected with an input port of a mold temperature control apparatus (not shown), and the second port 226 of the first mold base 2 and the second port 456 of the second mold base 4 may be connected with an output port of the mold temperature control apparatus. Therefore, the first ports 212, 442 may be input runners of the heat exchange medium, and the second ports 226, 456 may be output runners of the heat exchange medium. Each heat conductive partition 302 may be constructed by high thermal conductivity materials, and each sealing rings 303 may be constructed by rubbers. In some embodiments, the mold temperature control apparatus may be used as a mold temperature control machine.

Referring to FIG. 10, FIG. 11, FIG. 12, and FIG. 13, the number of the channel units 300 mounted on the first mold base 2 or the second mold base 4 is not limited. At least two channel units 300 may be mounted on the first mold base 2 or the second mold base 4. The shapes of the thermostat channels 301 and the region surrounded by the thermostat channels 301 may be in accordance with the shape of the molding cavity 6. Therefore, the thermostat target area 200 may correspond to the first core 3 and second core 5 and comprises the grooves 222, 452 in which the first core 3 and the second core 5 are respectively mounted.

Figure 10:
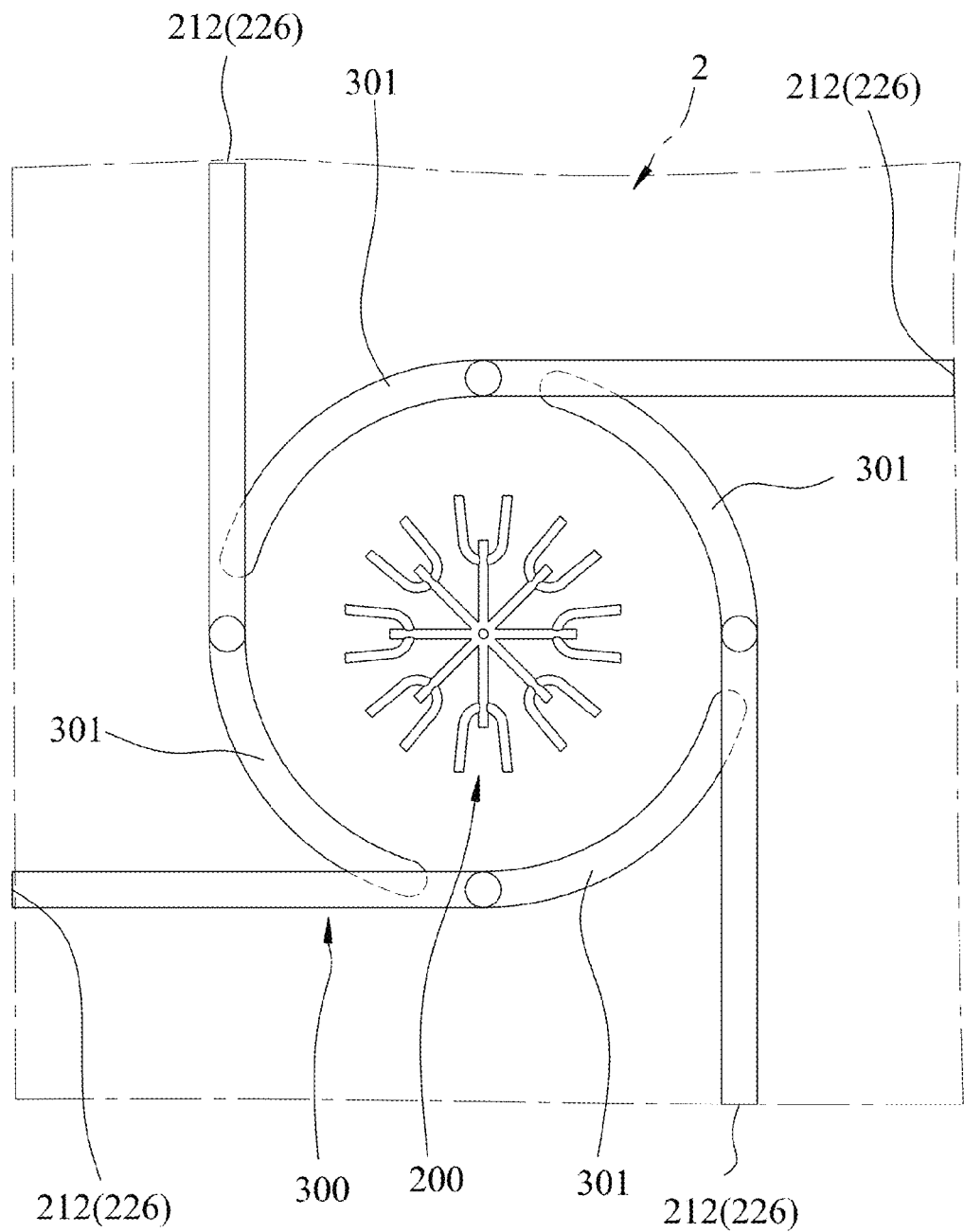
FIG. 10 is a schematic view of an embodiment of thermostat channels of a channel unit forming a non-closed circular structure.
Figure 11:
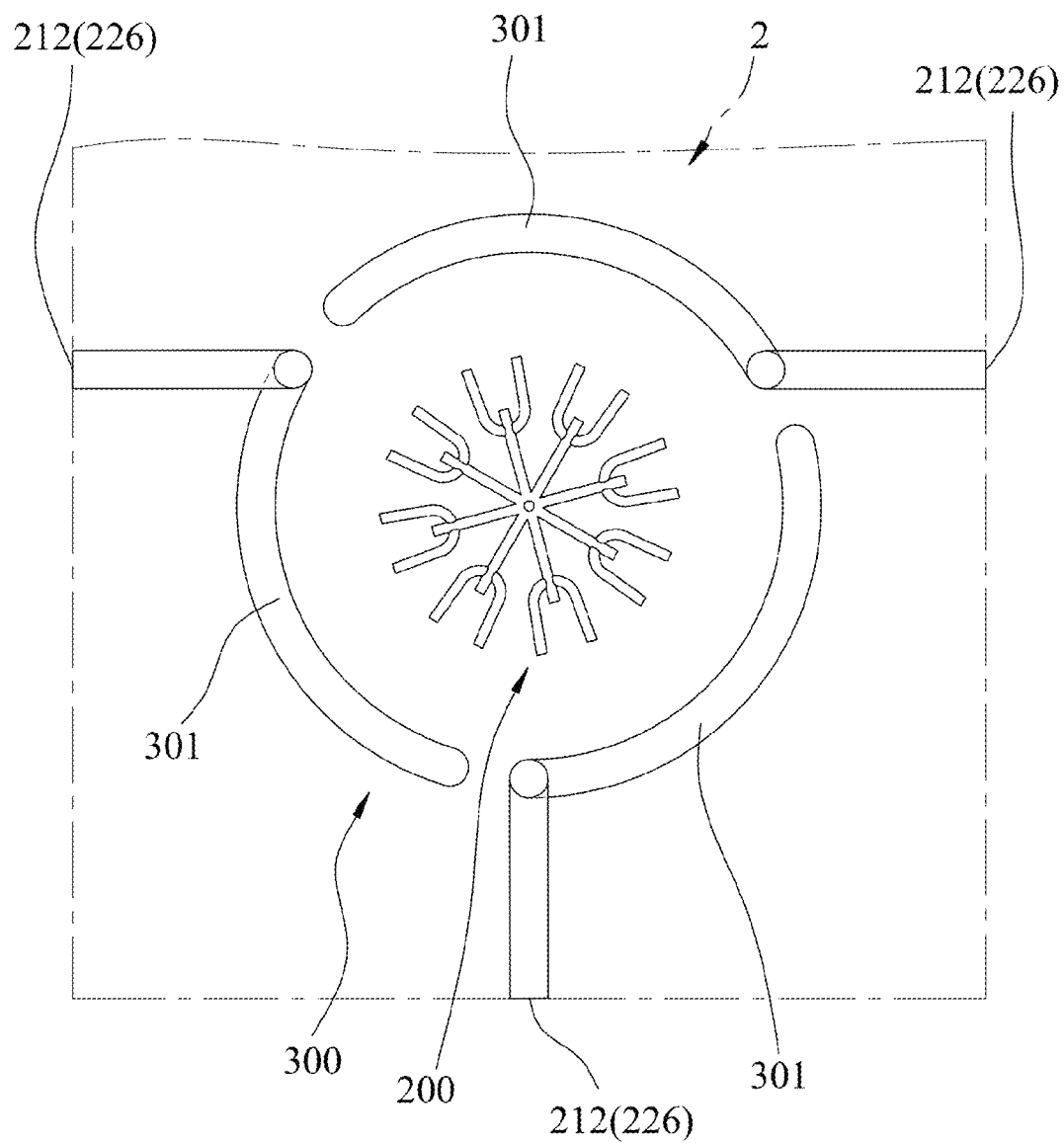
FIG. 11 is a schematic view of another embodiment of thermostat channels of a channel unit forming a non-closed circular structure.

Referring to FIG. 10 and FIG. 11, the thermostat channels 301 of the first mold base 2 and the second mold base 4 may respectively have arc shapes and form a non-closed circular structure to surround the thermostat target area 200.

Figure 12:
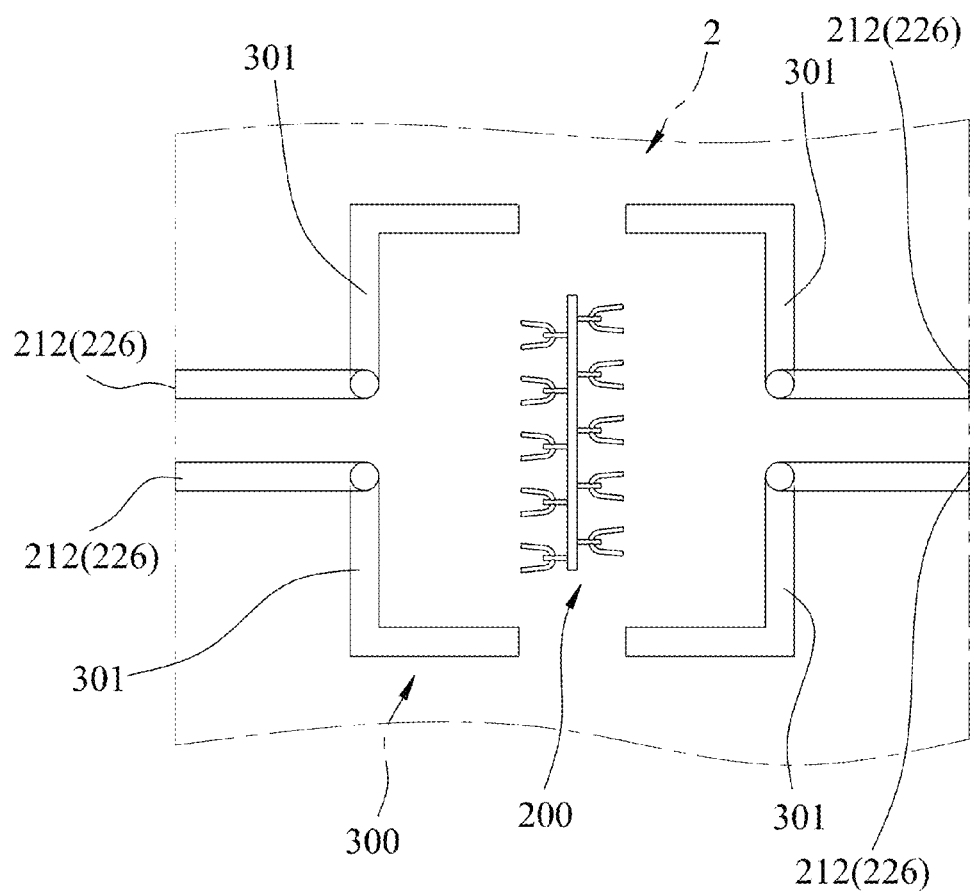
FIG. 12 is a schematic view of an embodiment of four thermostat channels of a channel unit forming a non-closed rectangular structure.

Referring to FIG. 12, the thermostat channels 301 of the first mold base 2 and the second mold base 4 may respectively have L shapes and form a non-closed rectangular structure to surround the thermostat target area 200.

Figure 13:
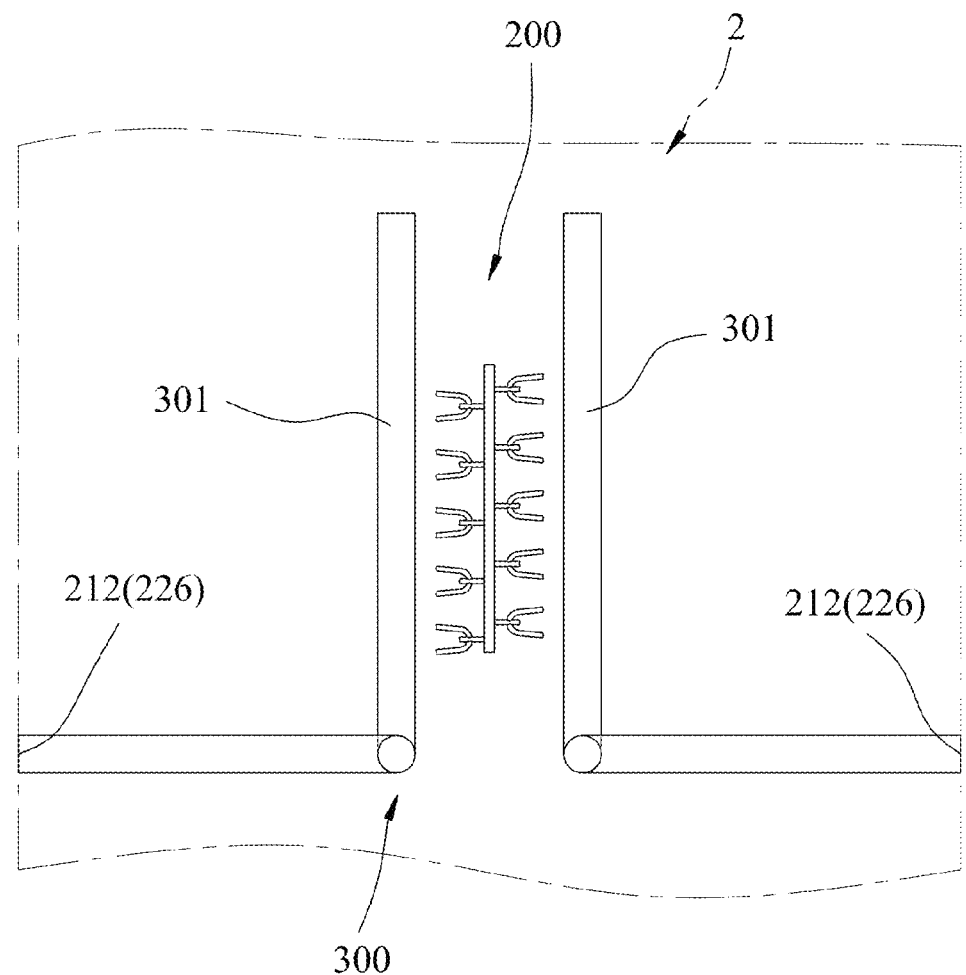
FIG. 13 is a schematic view of an embodiment of two thermostat channels of a channel unit disposed at two sides of a thermostat target area.

Referring to FIG. 13, the thermostat channels 301 of the first mold base 2 and the second mold base 4 may respectively have straight line shapes and are mounted on two opposite sides of the thermostat target area 200 which may have a rectangular shape.

The advantages of the mold apparatus of the present disclosure are described below:

The first channels 221, 441 of the thermostat channels 301 and the second channels 225, 455 of the thermostat channels 301 may be symmetrical. The first channels 221, 441 of the thermostat channels 301 may respectively be closed to the second channels 225, 455 of the thermostat channels 301. The assembly of the first channels 221, 441, the second channels 225, 455, and the heat conductive partitions 302 mounted between the first channels 221, 441 and the second channels 225, 455 may efficiently uniform the temperature of the heat exchange medium flowing through the first channels 211, 441 and the second channels 225, 455. Therefore, the temperature of the heat exchange medium flowing through the first channels 211, 411 between the ends of the first ports 212, 442 and the ends of the second channels 225, 455 may increase linearly and may exhibit a positive slope distribution. The temperature of the heat exchange medium flowing through the second channels 225, 455 between the ends of the second ports 226, 456 and the ends of the first channels 211, 411 may decrease linearly and may exhibit a negative slope distribution. The heat conductive partitions 302 may regulate the temperature of the first channels 211, 441 and the second channels 225, 455 to cause the uniform temperature distribution described above. In other words, if the temperature of the heat exchange medium flowing through the first channels 211, 441 is higher than the temperature of the heat exchange medium flowing through the second channels 225, 455, the heat conductive partition 302 or the heat conductive portion 302' may transmit the heat of the heat exchange medium flowing through the first channels 211, 441 to the heat exchange medium flowing through the second channels 225, 455, so that the heat exchange medium can control the temperature of the thermostat target area 220 by flowing through the first channels 211, 411 and second channels 225, 455, and uniform the temperature of the thermostat target area 200 via the thermal conduction of the heat conductive partition 302 or the heat conductive portion 302'.

Figure 14:
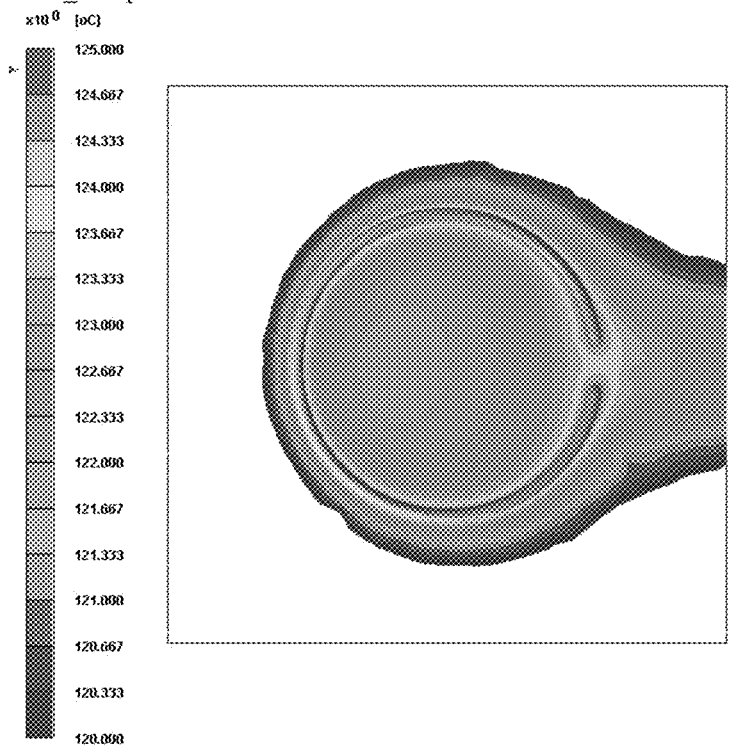
FIG. 14 is a simulation of a thermostat channel of a mold apparatus for controlling the temperature of a mold body according to a prior art.
Figure 14:
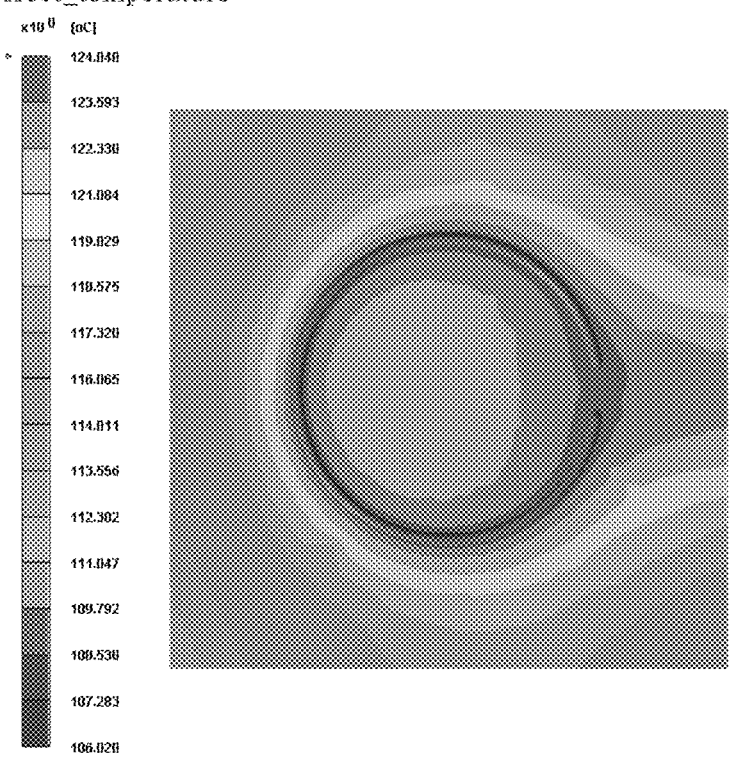
Figure 15:
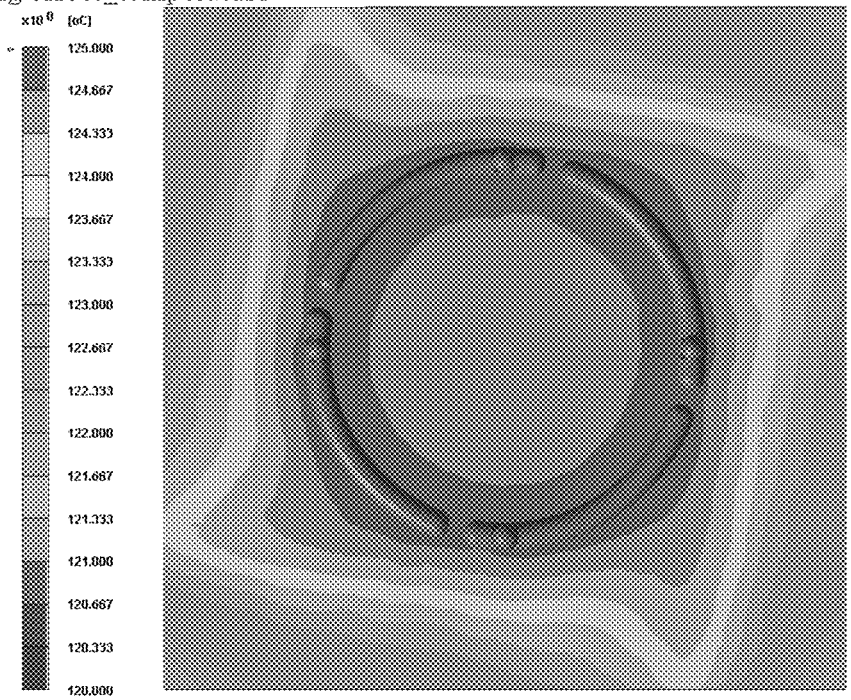
FIG. 15 is a simulation of thermostat channels for controlling the temperature of a mold body according to the present invention.
Figure 15:
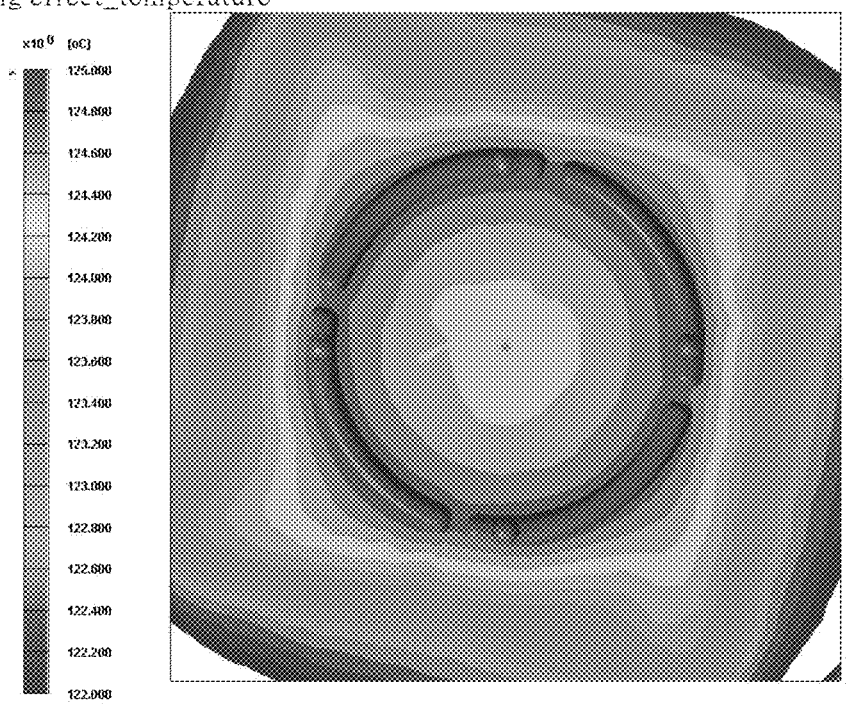

FIG. 14 shows a simulation of the cooling capability of a thermostat channel with non-closed circular shape according to a prior art. FIG. 15 shows a simulation of the cooling capability of four thermostat channels having arc shapes and forming a non-closed circular structure according to some embodiments of the present disclosure. The diameters of the four arc-shaped thermostat channels of the present disclosure are the same. In FIG. 15, the temperature distribution of the mold body is more uniform, and the temperature difference of the mold body is less than one degree. In FIG. 15, the temperature distribution of the mold body may have polarization, and the temperature difference of the mold body may be quadruple.

Referring to FIG. 3 and FIG. 4, an embodiment of a manufacturing method of a mold apparatus of the present disclosure is presented. The steps of the manufacturing method may comprise:

Providing a top clamping plate 21, forming a first port 212 on the side surface of the top clamping plate 21, forming a first channel 211 on the bottom surface of the top clamping plate 21, and connecting one end of the first channel 211 with the first port 212.

Providing a heat conductive partition 302 and a sealing ring 303 surrounding the outside of the heat conductive partition 302, mounting the heat conductive partition 302 on the bottom surface of the top clamping surface 21. The heat conductive partition 302 comprises a connect channel 304 disposed at the other end of the first channel 211 and connecting with the first channel 211. The connect channel 304 is a hole.

Providing a cavity plate 22, and mounting the cavity plate 22 on the bottom surface of the top clamping plate 21. The cavity plate 22 comprises a binding surface 221 which is closed to the top clamping plate 21, a parting surface 223 opposite to the top clamping surface 21, and a side surface 224 connecting with the binding surface 221 and the parting surface 223. A second channel 225 may be formed on the binding surface 221, wherein the first channel 211 and the second channel 225 may be symmetrical, and the second channel 225 may be sealed by the heat conductive partition 302. A groove 22 may be formed on the parting surface 222. A second port 226 may be formed on the side surface 224. The two opposite ends of the second channel 225 may respectively be connected with the second port 226 and the connect channel 304 for connecting with the heat conductive partition 302. A thermostat channel 301 may be constructed by the assembly of the first channel 212, the second channel 225, the second port 226 and the connect channel 304. A channel unit 300 may be constructed by the assembly of the thermostat channel 301, the heat conductive partition 302, and the sealing ring 303. A first mold base 2 may be constructed by the assembly of the top clamping plate 21 and the cavity plate 22.

Methods according to the present disclosure may comprise the steps of: Providing a first core 3, and disposing the first core 3 in the groove 222 of the cavity plate 22. The first core 3 may have a first molding surface 31.

Providing a bottom clamping plate 41.

Providing a spacer block 42, and mounting the spacer block 42 on the top surface of the bottom clamping plate 41, and forming a hole 421 through the spacer block 42.

Providing an ejector plate unit 43, and mounting the ejector plate unit 43 in the hole 421 of the spacer block 42. The ejector plate unit 43 comprises a bottom ejector plate 431 and a top ejector plate 432 mounted on the top surface of the bottom ejector plate 431.

Providing a support plate 44, and mounting the support plate 44 on the top surface of the spacer block 42, a first port 442 is formed on the side surface of the support plate 44, and a first channel 441 is formed on the top surface of the support plate 44.

Providing a core plate 45, and mounting the core plate 45 on the supporting plate 44. The core plate 45 may comprise a binding surface 451 closed to the support plate 44, a parting surface 453 opposite to the support plate 44, and a side surface 454 connecting with the binding surface 451 and the parting surface 453. A second channel 455 may be formed on the binding surface 451, and the first channel 441 and the second channel 455 may be symmetrical. A groove 452 may be formed on the parting surface 453. A second port 456 may be formed on the side surface 454. One end of the first channel 441 may be connected with the first port 442, and one end of the second channel 455 may be connected with the second port 456.

Providing a heat conductive partition 302 and a sealing ring 303 surrounding the outside of the hat conductive partition 302. The heat conductive partition 302 may be mounted between the support plate 44 and the core plate 45. The location of the heat conductive partition 302 may be between the first channel 441 and the second channel 455, and the first channel 441 and the second channel 455 are separated by the heat conductive partition 302. Forming a connect channel 304 on the heat conductive partition 302, and the connect channel 304 may respectively be connected with the other end of the first channel 441 and the other end of the second channel 445. A thermostat channel 301 may be constructed by the assembly of the first channel 441, the first port 442, the second channel 455, the second port 456, and the connect channel 304. A channel unit 300 may be constructed by the assembly of the thermostat channel 301, the heat conductive partition 302, and the sealing ring 303. A second mold base 4 may be constructed by the assembly of the bottom clamping plate 41, the spacer block 42, the ejector unit 43, the support plate 44 and the core plate 45.

Providing a second core 5, and mounting the second core 5 in the groove 452 of the second mold base 4. The second core 5 comprises a second molding surface 51 faced to the first molding surface 31. When the parting surface 223 of the first mold base 1 abuts against the parting surface 453 of the second mold base 3, the first molding surface 31, the parting surface 223 of the first mold base 2, the second molding surface 51, and the parting surface 453 of the second mold base 4 may define a molding cavity 6.

The thermostat channels 301 of the first mold base 2 and the thermostat channels 301 of the second mold base 4 may have arc shapes, and may form a non-closed circular structure to surround the thermostat target area 200. When the first mold base 2 abuts against the second mold base 4, the groove 222 of the first mold base 2 and the groove of the second mold base 4 may define the range of the thermostat target area 200.

Figure 16:
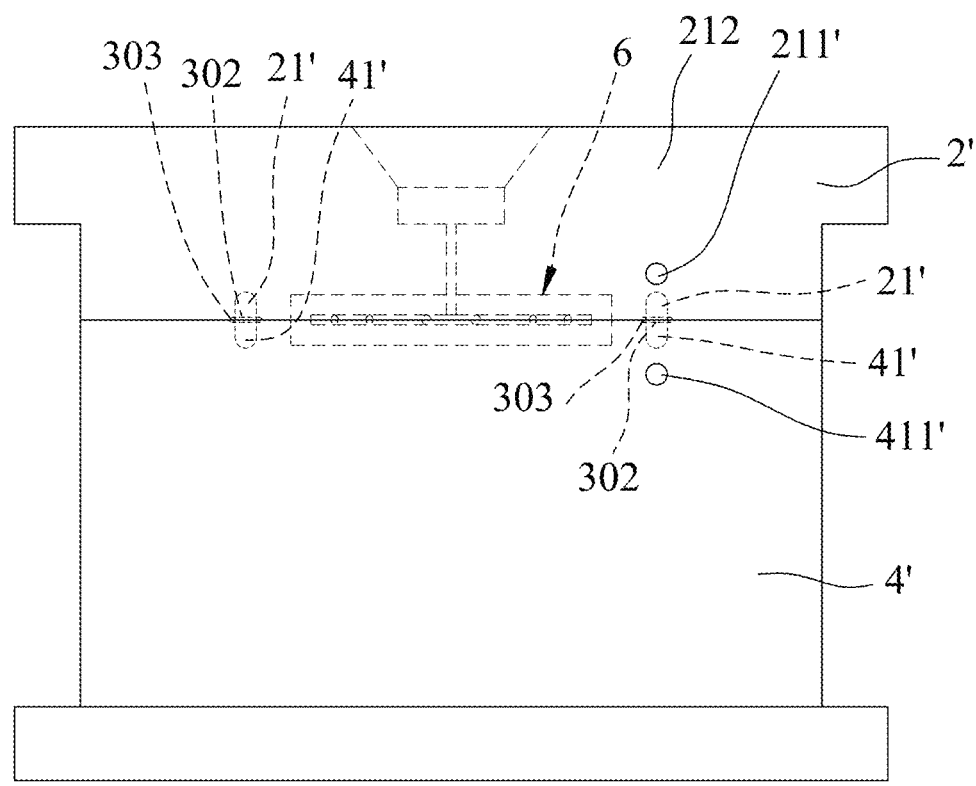
FIG. 16 is a side view of a second embodiment of a mold apparatus according to the present invention.
Figure 17:
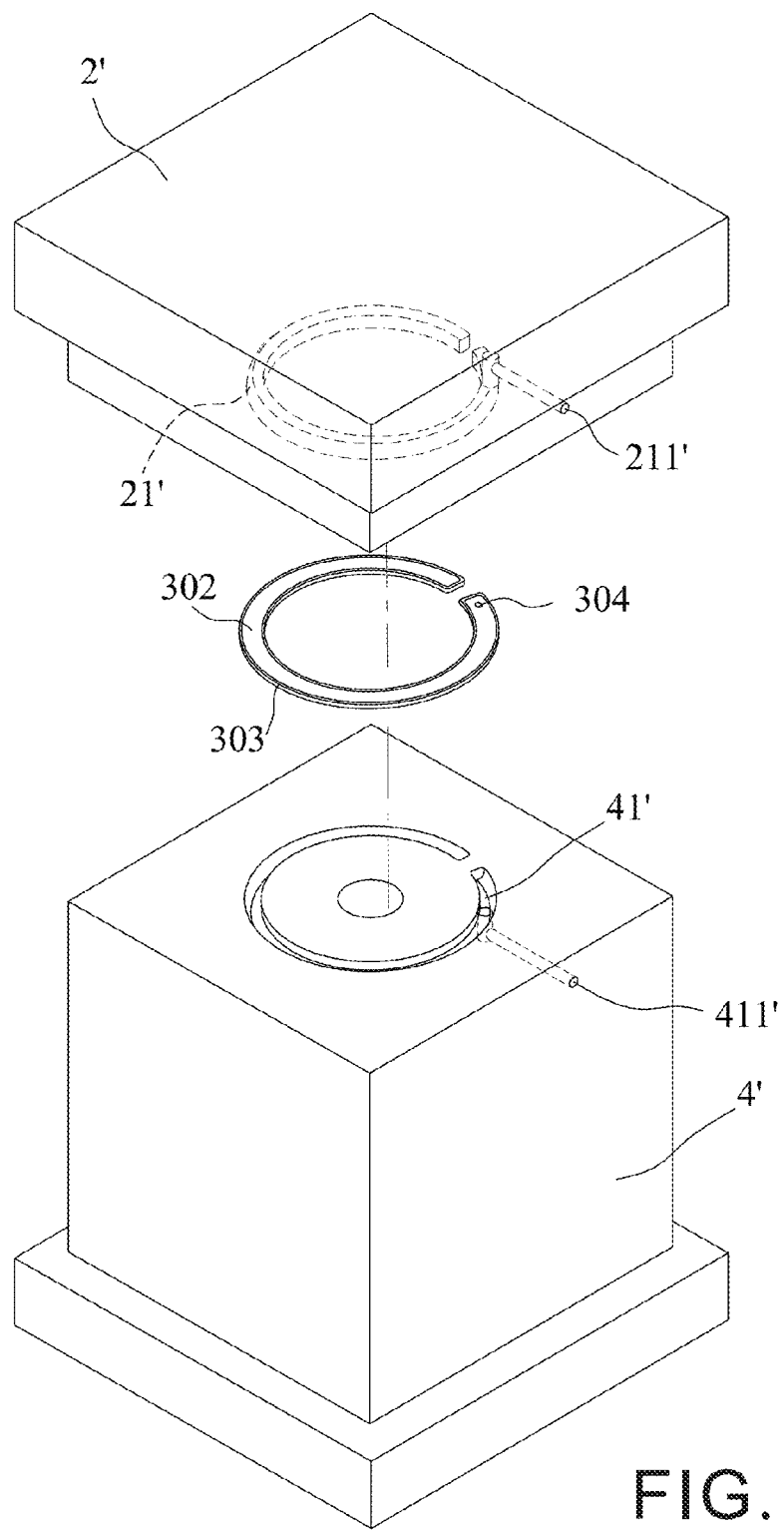
FIG. 17 is a perspective view of the mold apparatus in FIG. 16.

Referring to FIG. 16 and FIG. 17, another embodiment of a manufacturing method of a mold apparatus according to the present disclosure is presented. The manufacturing method may comprise the steps of:

Providing a first body 2', a second body 4' and a molding cavity 6 between the first body 2' and the second body 4', forming a first channel 21' on the first body 2', and forming a second channel 41' on the second body 4';

Providing a heat conductive partition 302 which may partially cover the first channel 21' and the second channel 41' and a sealing ring 303, which may surround the heat conductive partition 302. Mounting the heat conductive partition 302 and the sealing ring 303 between the first body 2' and the second body 4'. Therefore, the first channel 21' and the second channel 41' are respectively located at two opposite sides of the heat conductive partition 302. Forming a first port 211' on the first body 2', and the first channel 21' is connected with the outside via the first port 211'. Forming a second port 411' on the second body 4', and the second channel 41' is connected with the outside via the second port 411'. Forming a connect channel 304 on a portion of the heat conductive partition 302 which doesn't cover the first channel 21' and the second channel 41'. A thermostat channel 301 is constructed by the assembly of the first channel 21', the first port 211', the second channel 41', the second port 411', and the connect channel 304, and a channel unit 300 is constructed by the assembly of the thermostat channel 301, the heat conductive partition 302, and the sealing ring 303.

While various embodiments in accordance with the disclosed principles been described above, it should be understood that they are presented by way of example only, and are not limiting. Thus, the breadth and scope of exemplary embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. A mold apparatus receiving a heat exchange medium provided by a mold temperature control apparatus for maintaining the operating temperature of the mold apparatus, the mold temperature control apparatus including an input port and an output port, the mold apparatus comprising:
   a mold body, wherein the mold body includes a top clamping plate and a cavity plate, the cavity plate having a binding surface closed to the top clamping surface; and
   at least one channel unit;
     wherein each channel unit includes a thermostat channel mounted in the mold body, a heat conductive partition mounted in the thermostat channel, and a sealing ring mounted on two sides of the heat conductive partition;
     wherein the thermostat channel comprises a first channel formed on the bottom surface of the top clamping plate, a second channel formed on the binding surface of the cavity plate, and a connect channel;
     wherein the first channel is located at one side of the heat conductive partition and directly connected with the input port of the mold temperature control apparatus, and the second channel is located at an other side of the heat conductive partition and directly connected with the output port of the mold temperature control apparatus; and
     wherein the connect channel is connected with the first channel and the second channel.

2. The mold apparatus according to claim 1, wherein the connect channel of the at least one channel unit is mounted in the mold body and is opposite to the input ports and the output port of the mold temperature control apparatus.

3. The mold apparatus according to claim 1, wherein the connect channel of the at least one channel unit is mounted on the heat conductive partition.

4. The mold apparatus according to claim 1, wherein the connect channel of the at least one channel unit is mounted on the mold body.

5. The mold apparatus according to claim 1, wherein the mold body includes a thermostat target area having at least one molding cavity; wherein the mold apparatus comprises two channel units; wherein at least one thermostat channel of each channel unit comprises an arc shape; and wherein the thermostat channel of each channel unit forms a non-closed circular structure surrounding the thermostat target area.

6. The mold apparatus according to claim 1, wherein the mold body comprises a thermostat target area having at least one molding cavity; wherein a plurality of thermostat channels of the channel unit comprises L shapes; and wherein the thermostat channels of each channel unit forms a non-closed rectangular structure surrounding the thermostat target area.

7. The mold apparatus according to claim 1, wherein the mold body includes a thermostat target area comprising at least one molding cavity; wherein a plurality of thermostat channels of the channel unit comprises straight line shapes; and wherein the thermostat channels of each channel unit are parallel and mounted on two opposite sides of the thermostat target area.

* * * * *